United States Patent
Wall et al.

(10) Patent No.: US 9,891,436 B2
(45) Date of Patent: Feb. 13, 2018

(54) WAVEGUIDE-BASED DISPLAYS WITH ANTI-REFLECTIVE AND HIGHLY-REFLECTIVE COATING

(71) Applicant: Microsoft Technology Licensing, LLC, Redmond, WA (US)

(72) Inventors: R. Andrew Wall, Kirkland, WA (US); Tuomas Vallius, Espoo (FI); Pasi Pietila, Espoo (FI); Keita Oka, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/041,664

(22) Filed: Feb. 11, 2016

(65) Prior Publication Data
US 2017/0235142 A1   Aug. 17, 2017

(51) Int. Cl.
*G02B 27/14* (2006.01)
*G02B 27/01* (2006.01)
(Continued)

(52) U.S. Cl.
CPC .......... *G02B 27/0172* (2013.01); *G02B 1/115* (2013.01); *G02B 5/26* (2013.01); *G02B 6/0026* (2013.01); *G02B 6/0035* (2013.01); *G02B 6/0076* (2013.01); *G02B 2027/0112* (2013.01); *G02B 2027/0125* (2013.01)

(58) Field of Classification Search
CPC  G02B 27/01; G02B 27/0101; G02B 27/0149; G02B 27/017; G02B 27/0172; G02B 27/0176; G02B 27/0179

USPC .... 359/13, 14, 629–633, 462–477; 345/7–9; 348/115
See application file for complete search history.

(56) References Cited

U.S. PATENT DOCUMENTS 5,053,755 A   10/1991   Smith et al.
7,672,055 B2   3/2010   Amitai
(Continued)

FOREIGN PATENT DOCUMENTS

EP         2196729 A1        6/2010
EP      EP 2196729 A1 *   6/2010   ......... G02B 27/0101
(Continued)

OTHER PUBLICATIONS

International Search Report and Written Opinion dated Apr. 13, 2017, in PCT Application No. PCT/US2017/016313 filed Feb. 3, 2017, 11 Pages.
(Continued)

*Primary Examiner* — Stephone B Allen
*Assistant Examiner* — Travis Fissel
(74) *Attorney, Agent, or Firm* — Arent Fox LLP

(57) ABSTRACT

A near eye or heads up display system includes a display engine, at least two optical waveguides, and a respective coating on at least one of the major surfaces of at least one of the waveguides. At least one such coating has a low reflectance for light within a specific wavelength range for the waveguide and incident on a major surface of the waveguide on which the coating is located at an angle below a low threshold angle relative to a normal, and has a high reflectance for light within the specific wavelength range for the waveguide that is incident on the major surface on which the coating is located at an angle above a high threshold angle relative to the normal.

20 Claims, 7 Drawing Sheets

(51) Int. Cl.
*G02B 5/26* (2006.01)
*G02B 1/115* (2015.01)
*F21V 8/00* (2006.01)

(56) References Cited

U.S. PATENT DOCUMENTS

| | | | |
|---|---|---|---|
| 8,436,997 | B2 | 5/2013 | Brunfeld et al. |
| 8,835,204 | B2 | 9/2014 | Shi et al. |
| 2010/0066926 | A1 | 3/2010 | Tanijiri |
| 2011/0032957 | A1 | 2/2011 | Cable et al. |
| 2011/0317233 | A1* | 12/2011 | Hayashibe ........... G02B 26/101 359/201.2 |
| 2013/0148053 | A1* | 6/2013 | Minoura ................ G02B 1/118 349/61 |
| 2013/0182322 | A1* | 7/2013 | Silverstein ............. G02C 7/107 359/464 |
| 2013/0242392 | A1* | 9/2013 | Amirparviz ........ G02B 27/0172 359/485.05 |
| 2013/0314793 | A1 | 11/2013 | Robbins et al. |
| 2014/0064655 | A1 | 3/2014 | Nguyen et al. |
| 2014/0218801 | A1 | 8/2014 | Simmonds et al. |

FOREIGN PATENT DOCUMENTS

| | | |
|---|---|---|
| EP | 2837299 A1 | 2/2015 |
| WO | 2015022506 A1 | 2/2015 |

OTHER PUBLICATIONS

"An Introduction to Optical Coatings ", Published on: Sep. 1, 2013, Available at: http://www.edmundoptics.com/technical-resources-center/optics/an-introduction-to-optical-coatings/.

Vasilyev, et al., "Analysis of Ghost Images in a Compound Prismatic Combiner for Head-Up-Displays ", In Proceedings of SPIE Optical Design and Engineering VI, vol. 9626, Sep. 7, 2015, 3 pages.

"Lasers", Published on: Dec. 8, 2012, Available at: http://www.reynardcorp.com/optical-component-markets/lasers.html.

"Lenses: Multi-layer Diffractive Optical Element", Published on: Dec. 30, 2009, Available at: http://cpn.canon-europe.com/content/education/infobank/lenses/multi_layer_diffractive_optical_element.do.

"Waveguide-based Displays Maturing for Augmented Reality Applications", Published on: Oct. 1, 2015, Available at: http://www.displaydaily.com/articles/446-sponsored-articles/14132-waveguide-based-displays-maturing-for-augmented-reality-applications.

* cited by examiner

WAVEGUIDE-BASED DISPLAYS WITH ANTI-REFLECTIVE AND HIGHLY-REFLECTIVE COATING

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment.

These devices, which can be implemented as head-mounted display (HMD) glasses or other wearable near eye display devices, or as a heads up display, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides and/or other optical structures to display images of virtual objects to a user.

SUMMARY

Certain embodiments described herein relate to a near eye or heads up display system that includes a display engine, a waveguide assembly having at least two optical waveguides, and a respective coating on at least one of the major surfaces of at least one of the optical waveguides. At least one such coating has a low reflectance (e.g., of no more than 2 percent) for light within a specific wavelength range for the waveguide and incident on a major surface of the waveguide on which the coating is located at an angle below a low threshold angle (e.g., that is no more than 25 degrees) relative to a normal of the major surface having the coating. Additionally, the at least one such coating has a high reflectance (e.g., of at least 50 percent) for light within the specific wavelength range for the waveguide that is incident on the major surface on which the coating is located at an angle above a high threshold angle (e.g., that is at least 30 degrees) relative to the normal of the major surface having the coating. Such a coating can beneficially permit external light corresponding to a real world image to pass through the waveguide, so that the user can view a real world image that is being augmented by a virtual image that the waveguide(s) is/are being used to display. Another benefit of the coating is that it can reduce the presence or intensity of a ghost image of a real world image. The coating can also beneficially reduce an overall loss in virtual image intensity, reduce dark spots in a viewed virtual image, reduce ghost images (of the virtual image), and more generally, reduce the loss of some of the full image content (associated with a virtual image) that may otherwise occur if light undesirably leaks out of a waveguide while traveling from an input-coupler to an output-coupler of the waveguide by way of TIR.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Certain embodiments of the present technology relate to a near eye or heads up display system that includes a light source assembly, an imaging device, and a waveguide assembly. The light source assembly can include, e.g., red, green and/or blue light emitting elements that are configured to respectively produce red light within a corresponding red wavelength range, green light within a corresponding green wavelength range and blue light within a corresponding blue wavelength range. For a more specific example, one or more red light emitting elements can produce light within a red wavelength range (e.g., from 600 nm to 650 nm); one or more green light emitting elements can produce light within a green wavelength range (e.g., from 500 nm to 550 nm); and one or more blue light emitting elements can produce light within a blue wavelength range (e.g., from 430 nm to 480 nm). The imaging device can produce an image using light produced by the light source assembly, which can also be referred to more succinctly as the light source. The waveguide assembly can transfer light corresponding to the image from an input-pupil to an output-pupil, where the image can be viewed.

Figure 1:
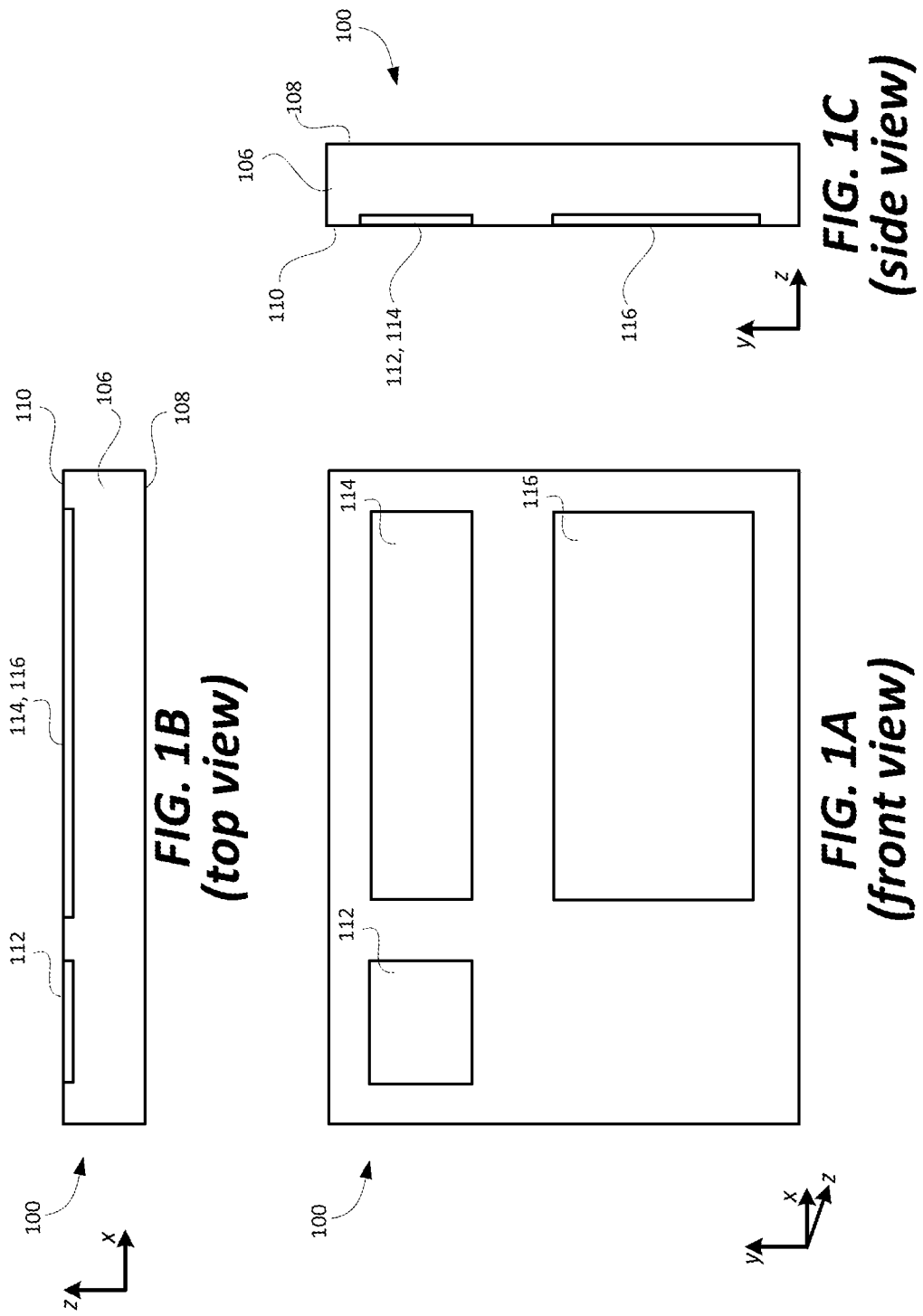
FIGS. 1A, 1B and 1C are front, top and side views, respectively, of an exemplary waveguide that can be used to replicate an image associated with an input-pupil to an expanded output-pupil.

As will be described in additional detail below, light traveling within one or more optical waveguides of a waveguide assembly may leak out of one or more of the waveguides, which can result in an overall loss in intensity, dark spots in a viewed image, and more generally, in a loss of some of the full image content. Further, if the leaked light is incident on an adjacent waveguide, the leaked light may be refracted into the adjacent waveguide and thereafter refracted out of the adjacent waveguide in a manner that results in an undesirable ghost image. Certain embodiments of the present technology described herein can mitigate the amount of light that leaks out of one or more waveguides, as will be described below. However, prior to describing details of such embodiments, exemplary waveguides and exemplary display systems including waveguides are described with reference to FIGS. 1 and 2.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of exemplary planar optical waveguide 100 that can be part of a waveguide assembly that is used to replicate an image associated with an input-pupil to an expanded output-pupil. The term "input-pupil," as used herein, refers to an aperture through which light corresponding to an image is overlaid on one or more input-couplers of one or more waveguides. The term "output-pupil," as used herein, refers to an aperture through which light corresponding to an image exits one or more output-couplers of one or more waveguides. The planar optical waveguide 100 will often be referred to hereafter more succinctly simply as an optical waveguide 100, or even more succinctly as a waveguide 100. As will be discussed in further detail below with reference to FIG. 2, the image that the waveguide 100 is being used to replicate, and likely also expand, can be generated using a display engine that includes a light source assembly and an imaging device.

Referring to FIGS. 1A, 1B and 1C, the planar optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the planar optical waveguide 100 from the input-coupler 112 to the output-coupler 116, out of the waveguide 100 so that the light is output and imaged from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The planar optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion. Such pupil expansion provides for an increased eye box, compared to if pupil expansion were not performed, thereby making the embodiments described herein practical for use in a near eye or heads up display. In certain embodiments, the intermediate-component is configured as a fold-grating. In other embodiments, the intermediate-component is a mirror based component, rather than a grating based component.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). Such DOEs can be produced using holographic processes, in which case, the DOEs can be more specifically referred to a holographic optical elements (HOEs). The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114, as noted above, can be implemented using a fold-grating, or can alternatively be implemented as a mirror based pupil expander, but is not limited thereto. Where the input-coupler 112 is a diffraction grating, it can be referred to more specifically as an input diffraction grating 112. Where the intermediate-component 114 is a diffraction grating, it can be referred to more specifically as an intermediate diffraction grating 114. Similarly, where the output-coupler 116 is a diffraction grating, it can be referred to more specifically as an output diffraction grating 116.

A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 100, from the input-coupler 112 to the output-coupler 114, by way of TIR, can be better appreciated from FIG. 2, which is discussed below.

Figure 2:
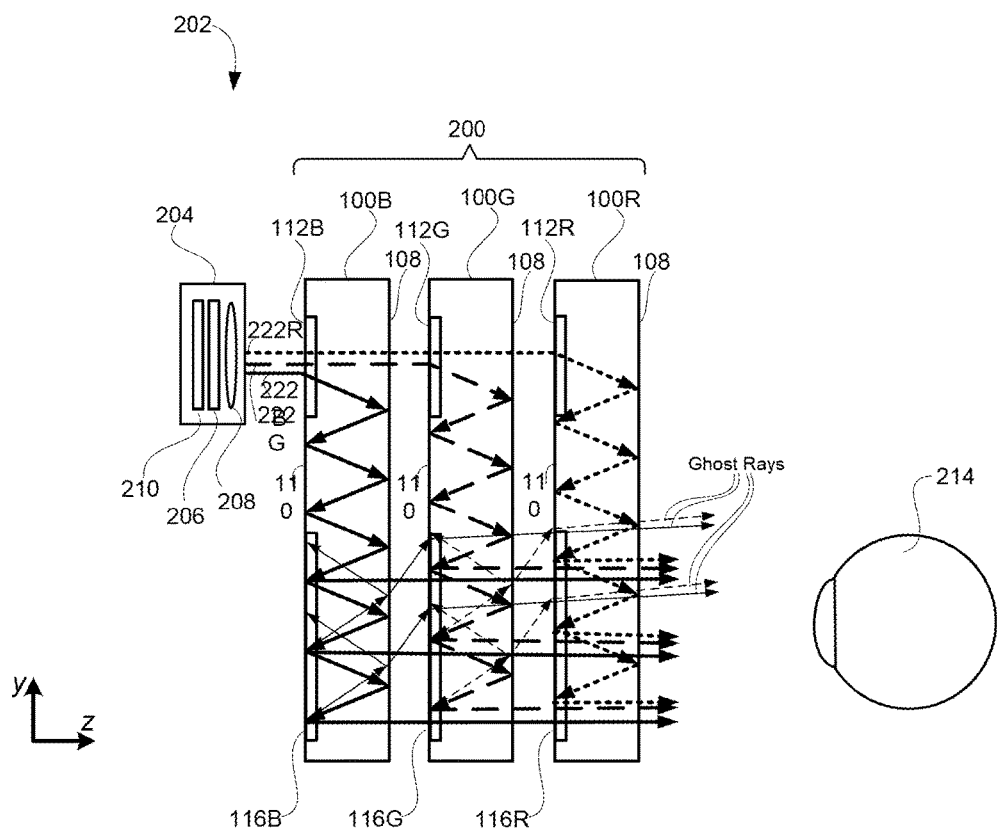
FIG. 2 is side view of the exemplary display system including a plurality of the waveguides introduced with reference to FIGS. 1A, 1B and 1C, and also shows a display engine that generates an image including angular content that is coupled into the waveguides by respective input-couplers, and also shows an eye that is viewing the image within an eye box that is proximate output-couplers of the waveguides.

Referring to FIG. 2, a side view of an exemplary display system 202 is shown therein. The display system 202 is shown as including three waveguides labeled 100R, 100G, 100B (each of which can be similar to the waveguide 100 introduced with reference to FIGS. 1A, 1B and 1C) and a display engine 204 that generates an image including angular content that is coupled into the waveguides 100R, 100G and 100B by the input-couplers 112R, 112G and 112B. FIG. 2 also shows a human eye 214 that is viewing the image (as a virtual image) within an eye box that is proximate the output-couplers 116R, 116G and 116B. Explained another way, the human eye 214 is viewing the image from an output-pupil associated with the waveguides 100R, 100G and 100B. The display system 202 can be, e.g., a near eye display or a heads up display. The display engine 204 can include, e.g., an imaging device 206 (also known as an image former), an imaging lens 208 and a light source assembly 210 (also known as an illuminator 210, or simply as a light source 210), but is not limited thereto.

The waveguides 100R, 100G and 100B can be configured, respectively, to transfer red, green and blue light corresponding to an image from an input-pupil to an output-pupil. More specifically, an input-coupler 112R of the waveguide 100R can be configured to couple light (corresponding to the image) within a red wavelength range into the waveguide 100R, and the output-coupler 116R of the waveguide 100R can be configured to couple light (corresponding to the image) within the red wavelength range (which has travelled from the input-coupler 112R to the output-coupler 116F by way of TIR) out of the waveguide 100R. Similarly, an input-coupler 112G of the waveguide 100G can be configured to couple light (corresponding to the image) within a green wavelength range into the waveguide 100G, and the output-coupler 116G of the waveguide 100G can be configured to couple light (corresponding to the image) within the green wavelength range (which has travelled from the input-coupler 112G to the output-coupler 116G by way of TIR) out of the waveguide 100G. Further, an input-coupler 112B of the waveguide 100B can be configured to couple light (corresponding to the image) within a blue wavelength range into the waveguide 100B, and the output-coupler 116B of the waveguide 100B can be configured to couple light (corresponding to the image) within the blue wavelength range (which has travelled from the input-coupler 112B to the output-coupler 116B by way of TIR) out of the waveguide 100B. In accordance with an embodiment, the red wavelength range is from 600 nm to 650 nm, the green wavelength range is from 500 nm to 550 nm, and the blue wavelength range is from 430 nm to 480 nm. Other wavelength ranges are also possible.

The waveguides 100R, 100G and 100B can be referred to collectively as the waveguides 100, or individually as a waveguide 100. Two or more of the waveguides 100 can be referred to as a waveguide assembly 200. More specifically, multiple waveguides 100 can be stacked, back-to-back, to provide the waveguide assembly 200. The distance between adjacent waveguides 100 of the waveguide assembly 200 can be, e.g., between approximately 50 micrometers (µm) and 300 µm, but is not limited thereto. While not specifically shown, spacers can be located between adjacent waveguides 100 to maintain a desired spacing therebetween. The input-couplers 112G, 112R and 112B can be referred to collectively as the input-couplers 112, or individually as an input-coupler 112. Similarly, the output-couplers 116G, 116R and 116B can be referred to collectively as the output-couplers 116, or individually as an output-coupler 116. While the waveguide assembly 200 is shown as including three waveguides 100, it is also possible that a waveguide assembly include more or less than three waveguides, as will be described in additional detail below.

Each of the input-couplers 112 have an input angular range, and each of the output-coupler 116 have an output angular range. In accordance with certain embodiments, all of the input-couplers 112 have substantially the same input angular range, and all of the output-couplers 116 have substantially the same output angular range. In accordance with certain embodiments, the input angular range for the input-couplers 112 is substantially the same as the output angular range for the output-couplers 116. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

Each input-coupler 112 and output-coupler 116 of a waveguide 100 can have a preferential polarization orientation, wherein the coupling efficiency for light having the preferential polarization orientation will be higher than for light having a non-preferential polarization orientation. For example, where a coupler is a diffraction grating, the preferential polarization orientation may be specified by a direction of the grating lines of the diffraction grating. If the display engine 204 is configured to output an image comprising light having a first linear polarization orientation, then the input-coupler 112 and the output-coupler 116 of one or more waveguides 100 (that is/are configured to transfer light corresponding to the image from an input-pupil to an output-pupil, where the image can be viewed, and to perform pupil expansion) can be configured to have the first linear polarization orientation as its preferential linear polarization orientation.

The preferential polarization orientation of a coupler (e.g., 112 or 116) can be a linear polarization orientation, which can either be a P linear polarization orientation, or an S linear polarization orientation, which orientations are orthogonal relative to one another. It is also possible that the preferential linear polarization orientation of a coupler can be a polarization that is neither a P linear polarization orientation, nor an S linear polarization orientation, but rather, is a polarization orientation that is oriented somewhere between the S and P linear polarization orientations. The P linear polarization orientation is also known as transverse-magnetic (TM), and the S linear polarization orientation is also known as transverse-electric (TE). The input-coupler 112 and the output-coupler 116 of a waveguide 100 can have the same preferential linear polarization orientation. Alternatively, the input-coupler 112 and the output-coupler 116 of a waveguide 100 can have different preferential linear polarization orientations from one another, which may be the case, e.g., where the waveguide 100 includes in intermediate-component 114 that rotates the polarization of internally reflected light as the light travels within the waveguide from the input-coupler 112 to the intermediate-component 114, and then from the intermediate-component 114 to the output-coupler 116. It is also possible that a preferential polarization of one or more of the couplers is a circular polarization.

The imaging device 206 of the display engine 204 can be implemented using a transmissive projection technology where a light source is modulated by an optically active material, and backlit with white light. These technologies are usually implemented using liquid crystal display (LCD) type displays with powerful backlights and high optical energy densities. The light source assembly 210 can provide the aforementioned backlighting. The imaging device 206 can also be implemented using a reflective technology for which external light is reflected and modulated by an optically active material. Digital light processing (DLP), liquid crystal on silicon (LCOS), scanning MEMs (Microelectromechanical systems) display technology, and Mirasol® display technology from Qualcomm, Inc. are all examples of reflective technologies. The imaging device 206, alone or in combination with the light source assembly 210, can also be referred to as a micro display. The imaging lens 208 is arranged to receive a display image from the imaging device 206, to collimate and project the display image at a given defined field of view, and to form a pupil at the location of the input-couplers 112 of the waveguides 100. In accordance with an embodiment, an input-pupil associated with the waveguide may be approximately the same size as an output-pupil associated with the display engine 204, e.g., 5 mm or less in some embodiments, but is not limited thereto.

FIG. 2 is not intended illustrate the precise locations of the light source assembly 210 relative to the imaging device 206. Rather, FIG. 2 is intended to illustrate that the imaging device 206 utilizes light, generated by the light source assembly 210, to produce an image. For example, various optical elements, such as lenses, mirrors, birdbath optics and/or beam splitters may be included in the display engine 204 to cause light that is produced by the light source assembly 210 to be reflected off an image generating component (e.g., a LCOS display element, DLP display element or a scanning MEMs micro-scanning mirror element) of the imaging device 206. Regardless of the exact configuration, eventually light associated with the image is caused to be incident on the input-couplers 112 of the waveguides 100, so that the light associated with the image can travel, by way of total internal reflection (TIR), from the input-couplers 112 to the output-couplers 116, where the light is output and imaged from an output-pupil by a human eye. When light exits the waveguide 100, proximate the output-couplers 116, a human eye, which has a lens in it, receives the collection of angles associated with a pupil and coverts it back to an image, e.g., the image produced by the imaging device 206 of the display engine 204 in FIG. 2.

As noted above in the discussion of FIGS. 1A-1C, each of the waveguides 100 can optionally include an intermediate-component 114 that performs one of horizontal and vertical pupil expansion, and the output-coupler 116 can perform the other one of horizontal or vertical pupil expansion. Where the waveguides 100, and more specifically the components 114 and/or 116 thereof is/are configured to perform pupil expansion, then an expanded pupil is converted to an image by the lens of a human eye.

In FIG. 2, the display engine 204 is shown as facing the back-side surface 110 of the waveguides 100, and the eye 214 is shown as facing the front-side surfaces 108 opposite and parallel to the back-side surfaces 110. This provides for a periscope type of configuration in which light enters the waveguides on one side of each waveguide 100, and exits the waveguides at an opposite side of each waveguide 100. Alternatively, each of the input-couplers 112 and the output-couplers 116 can be implemented in a manner such that the display engine 204 and the eye 214 are proximate to and face a same major planar surface (108 or 110).

The waveguides 100 can be incorporated into a see-through mixed reality display device system, but is not limited to use therewith. A separate instance of each of the waveguide assemblies 200 and the display engine 204 can be provided for each of the left and right eyes of a user. In certain embodiments, such waveguide assemblies 200 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide assembly 200 for each of the left and right eyes of a user, there can be a separate display engine 204 for each of the waveguide assemblies 200, and thus, for each of the left and right eyes of the user.

The light source assembly 210 can include red, green and/or blue light sources that are configured to respectively produce red light within a corresponding red wavelength range, green light within a corresponding green wavelength range and blue light within a corresponding blue wavelength range. For example, the light source assembly 210 can include red, green and blue light emitting diode (LEDs), super luminescent light emitting diodes (SLEDs), a quantum dot light emitting diodes (QD-LED), or laser diodes (LDs), but is not limited thereto. In accordance with an embodiment, the red wavelength range is from 600 nm to 650 nm, the green wavelength range is from 500 nm to 550 nm, and the blue wavelength range is from 430 nm to 480 nm, as noted above. Narrower or wider wavelength ranges are also possible.

In FIG. 2, the thick dotted arrowed line 222R is representative of red (R) light corresponding to an image that is output by the display engine 204, the thick dashed arrowed line 222G is representative of green (G) light corresponding to the image that is output by the display engine 204, and the thick solid arrowed line 222B is representative of blue (B) light corresponding to the image that is output by the display engine 204. While the waveguides 100R, 100G and 100B are shown as being stacked in a specific order, the order in which the waveguides 100 are stacked can be changed.

When implemented as an input diffraction grating, the input-coupler 112b is designed to diffract blue light within an input angular range (e.g., +/−15 degrees relative to the normal) and within the blue wavelength range (e.g., from 430 nm to 480 nm) into the waveguide 100B, such that an angle of the diffractively in-coupled blue light exceeds the critical angle for the waveguide 100B and can thereby travel by way of TIR from the input-coupler 112B to the output-coupler 116B. Further, the input-coupler 112B is designed to transmit light outside the blue wavelength range, so that light outside the blue wavelength range (such as light within the green and red wavelength ranges) will pass through the waveguide 100B.

When implemented as an input diffraction grating, the input-coupler 112G is designed to diffract green light within an input angular range (e.g., +/−15 degrees relative to the normal) and within the green wavelength range (e.g., from 500 nm to 550 nm) into the waveguide 100G, such that an angle of the diffractively in-coupled green light exceeds the critical angle for the waveguide 100G and can thereby travel by way of TIR from the input-coupler 112G to the output-coupler 116G. Further, the input-coupler 112G is designed to transmit light outside the green wavelength range, so that light outside the green wavelength range (such as light within the red wavelength range) will pass through the waveguide 100G.

When implemented as an input diffraction grating, the input-coupler 112R is designed to diffract red light within an input angular range (e.g., +/−15 degrees relative to the normal) and within the red wavelength range (e.g., from 600 nm to 650 nm) into the waveguide 100R, such that an angle of the diffractively in-coupled red light exceeds the critical angle for the waveguide 100R and can thereby travel by way of TIR from the input-coupler 112R to the output-coupler 116R. Further, the input-coupler 112R is designed to transmit light outside the red wavelength range, so that light outside the red wavelength range will pass through the waveguide 100R.

More generally, each of the waveguides 100 can include an input-coupler 112 that is configured to couple-in light within an input angular range (e.g., +/−15 degrees relative to the normal) and within a specific wavelength range into the waveguide, such that an angle of the in-coupled light exceeds the critical angle for the waveguide 100 and can thereby travel by way of TIR from the input-coupler 112 to the output-coupler 116 of the waveguide 100, and such that light outside the specific wavelength range is transmitted and passes through the waveguide 100.

Figure 3:
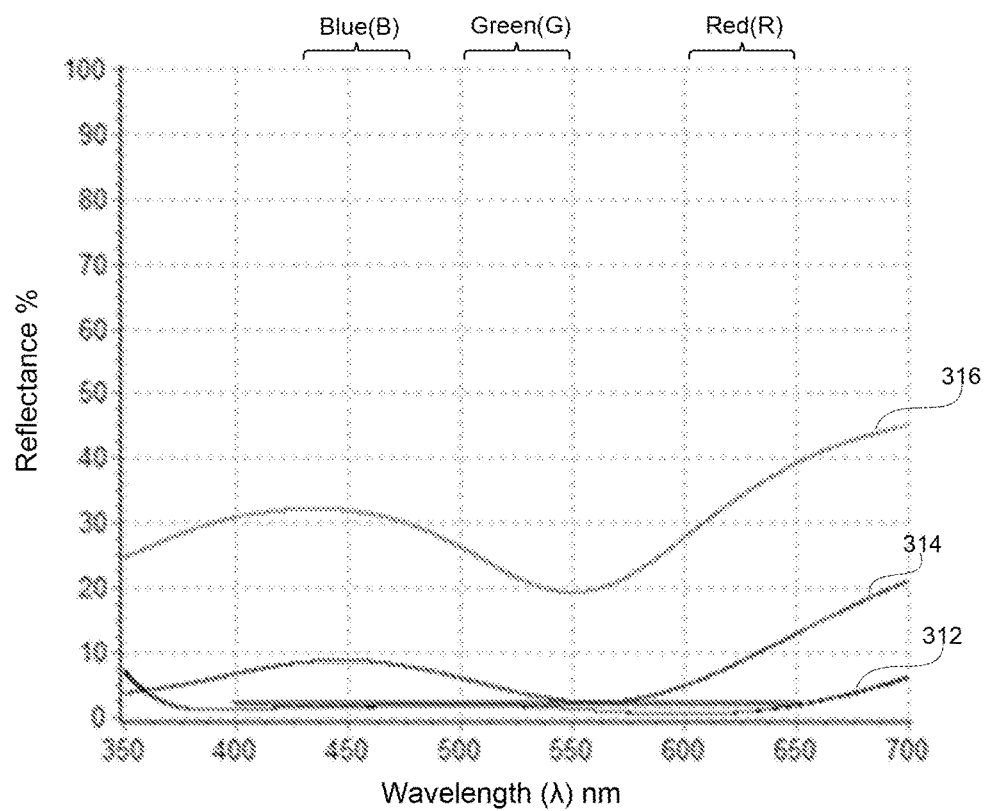
FIG. 3 is a graph that illustrates the reflectance percentage (%) at a glass-to-air medium boundary of a waveguide coated with a broadband anti-reflective (AR) coating, for light traveling at different angles relative to a normal to the major surfaces of the waveguide as a function of wavelength.

The major planar surface 108 of each of the waveguides 100 shown in FIG. 2 may be coated with a broadband anti-reflective (AR) coating, which is utilized to reduce reflectance within a visible wavelength range (e.g., from 400 nm to 650 nm) and across an angular field of view (e.g., +/−15 degrees relative to the normal) of the display system 202. FIG. 3 is a graph that illustrates the reflectance %, at a glass-to-air medium boundary of a waveguide 100 coated with a broadband AR coating, for light traveling at different angles relative to the normal to the surface 108 of the waveguide 100 as a function of wavelength, wherein the critical angle for the glass-to-air medium boundary is assumed to be calculated to be 36 degrees. (This is just an exemplary critical angle, as the critical angle depends on the index of refraction of the bulk substrate of the optical waveguide, and thus, will change if a bulk substrate having a different index of refraction is used.) More specifically, the plotted line 312, which corresponds to light traveling at 5 degrees relatively to the normal of the major planar surface 108 of the waveguide 100, illustrates that light of such a low angle (relative to the critical angle) has an average reflectance of no greater than 2% within the visible wavelength range from 400 nm to 650 nm. The plotted line 314, which corresponds to light traveling at 30 degrees relatively to the normal of the major planar surface 108 of the waveguide 100, illustrates that light of such a high angle (that is close to the critical angle) has an average reflectance ranging from about 2% to about 14% within the visible wavelength range from 400 nm to 650 nm (which includes red, green and blue wavelength ranges). The plotted line 316, which corresponds to light traveling at 35 degrees relatively to the normal of the major planar surface 108 of the waveguide 100, illustrates that light at such a high angle (that is even closer to the critical angle) has an average reflectance ranging from about 20% to about 40% within the visible wavelength range from 400 nm to 650 nm. More specifically, the plotted line 316 illustrates that blue light (within a blue wavelength range from 430 nm to 480 nm) traveling at 35 degrees relatively to the normal of the major planar surface 108 of the waveguide 100 will have an average reflectance of about 30%, green light (within a green wavelength range from 500 nm to 550 nm) will have an average reflectance of about 25%, and red light (within the red wavelength range is from 600 nm to 650 nm) will have an average reflectance of about 34%).

Overall, the graph in FIG. 3 shows that where a waveguide is coated with a broadband AR coating, light having low angles will have a very low reflectance (of 2% or less), and light having higher angles that approach the critical angle (and thus, approach the TIR limit) will have a somewhat higher reflectance (e.g., up to about 40%), but not a very high reflectance. Since transmittance (T) plus reflectance (R) is equal to 1 (i.e., T+R=1), then light having an angle approaching the critical angle will have a transmittance of up to 60% (since $T=1-R\approx1-0.4\approx0.6$). This means that a relatively high percentage of light having an angle approaching the critical angle of a waveguide coated with an AR coating will leak out of the waveguide. Leaked light can result in an overall loss in intensity, dark spots in a viewed image, and more generally, in a loss of some of the full image content. Further, if the leaked light is incident on an adjacent waveguide, the leaked light may be refracted into the adjacent waveguide and thereafter refracted out of the adjacent waveguide at a different angle (than the angle at which non-leaked light is out-coupled by the an output-coupler 116 of the original waveguide 100 carrying the light) that can result in an undesirable ghost image. This will be explained below in further detail with reference to FIG. 2. The leaking of light can occur for a few reasons, including tight design tolerances and imperfect manufacturing procedures associated with the waveguides 100.

Referring back to FIG. 2, the solid thick arrowed lines shown within the waveguide 100B are representative of blue light traveling by way of TIR from the input-coupler 112B to the output-coupler 116B. The dashed thick arrowed lines shown within the waveguide 100G are representative of green light traveling by way of TIR from the input-coupler 112G to the output-coupler 116G. The dotted thick arrowed lines shown within the waveguide 100R are representative of red light traveling by way of TIR from the input-coupler 112R to the output-coupler 116R.

In FIG. 2 the solid thick arrowed lines directed from the output-coupler 116B of the waveguide 100B toward the human eye 214 at a first angle (zero degrees relative to the normal, in this example) are representative of blue light that is purposefully out-coupled by the output-coupler 116B of the waveguide 100B for viewing by the human eye 214. By contrast, the solid thin arrowed lines (labeled ghost rays) that are shown as being refracted from the surface 108 of the waveguide 116B and incident on the adjacent waveguide 100G are shown as being directed, by the output-coupler 116G of the waveguide 100G, at a different angle towards the human eye 214, which can result in an undesirable ghost image. Such a ghost image is essentially a replica of the desired image that is offset in position and super imposed on top of the desired image. The solid thin arrowed lines that are shown as being refracted from the surface 108 of the waveguide 116B are representative of leaked light, which as noted above, can result in a ghost image, an overall loss in intensity, dark spots in a viewed image, and more generally, in a loss of some of the full image content.

In FIG. 2 the dashed thick arrowed lines directed from the output-coupler 116G of the waveguide 100G toward the human eye 214 at a first angle (zero degrees relative to the normal, in this example) are representative of green light that is purposefully out-coupled by the output-coupler 116G of the waveguide 100G for viewing by the human eye 214. By contrast, the dashed thin arrowed lines (labeled ghost rays) that are shown as being refracted from the surface 108 of the waveguide 116G and incident on the adjacent waveguide 100R are shown as being directed, by the output-coupler 116R of the waveguide 100R, at a different angle towards the human eye 214, which can result in an undesirable ghost image, and more generally, in a loss of some of the full image content.

In FIG. 2 the dotted thick arrowed lines directed from the output-coupler 116R of the waveguide 100R toward the human eye 214 at a first angle (zero degrees relative to the normal, in this example) are representative of red light that is purposefully out-coupled by the output-coupler 116R of the waveguide 100R for viewing by the human eye 214. While not specifically shown, in a similar manner as was discussed above with reference to the blue and green light, a portion of the red light may be refracted out of the waveguide 116R, which can results in a loss of some of the full image content.

In accordance with certain embodiments described herein, rather than coating the major planar surface 108 of each waveguide 100 with a broadband AR coating, one or more of the major surfaces of one or more of the waveguides 100 is/are coated with a coating (specifically designed for the waveguide 100) that has a low reflectance of no more than 2% for low angles (e.g., angle of less than 25 degrees) relative to the normal, and has a high reflectance of at least 50% for high angles (e.g., angles of at least 30 degrees) relative to the normal, for light within the wavelength range for which the waveguide 100 is designed. Preferably, the high reflectance for high angles is at least 75%, and even more preferably is at least 90%. Additional details of such embodiments are described below with reference to FIGS. 4 and 5.

Where the coating has a high reflectance of at least 50% for high angles (e.g., angles of at least 30 degrees) relative to the normal (for light within the wavelength range for which the waveguide 100 is designed), the coating will reduce by at least a factor of two the amount of light that refractively leaks out of the surface of the waveguide 100 on which the coating is located, compared to if the broadband AR coating described with reference to FIG. 3 were instead located on the surface of the waveguide 100. Where the coating has a high reflectance of at least 75% for high angles (e.g., angles of at least 30 degrees) relative to the normal (for light within the wavelength range for which the waveguide 100 is designed), the coating will reduce by at least a factor of three the amount of light that refractively leaks out of the surface of the waveguide 100 on which the coating is located, compared to if the broadband AR coating described with reference to FIG. 3 were instead located on the surface of the waveguide 100.

Figure 4:
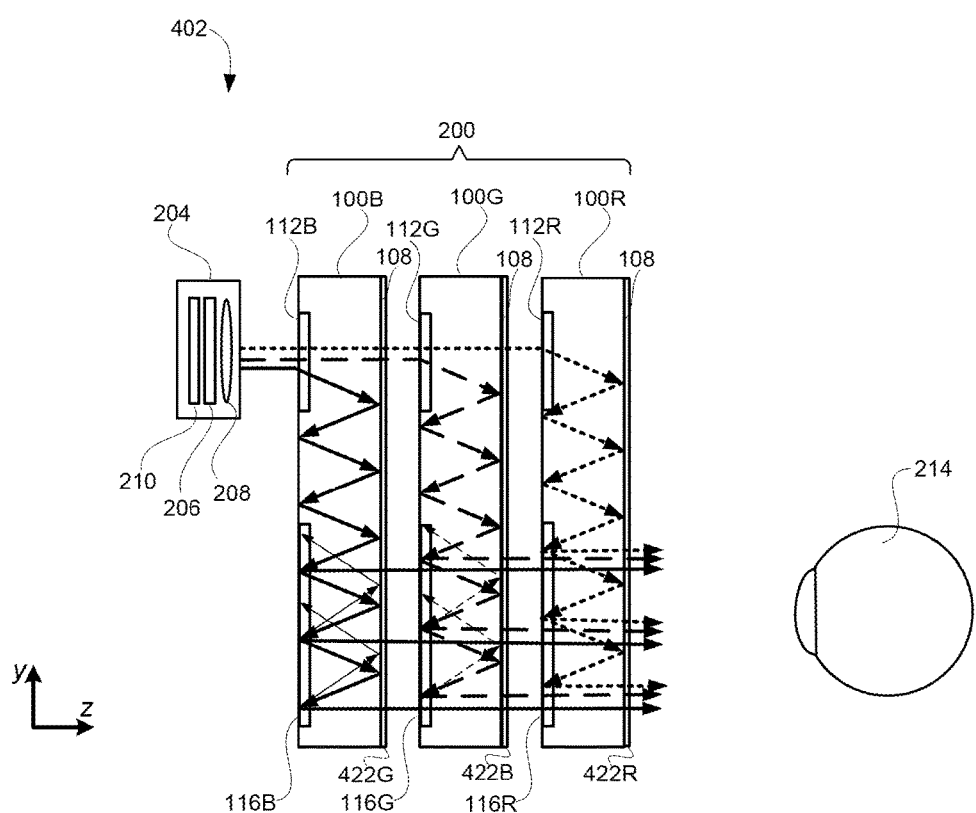
FIG. 4 is side view of a display system according to an embodiment of the present technology, wherein a major surface of each of the optical waveguides of the display system is coated with a respective coating that is configured to have a low reflectance for low angles relative to the normal, and have a high reflectance for high angles relative to the normal.

FIG. 4 illustrates a display system 402 that is similar to the display system 202 discussed above with reference to FIG. 2, but also shows the major planer surfaces 108 of the waveguides 100R, 100G and 100B being coated, respectively, with coatings 422R, 422G and 422B, in accordance with embodiments of the present technology. More specifically, the coating 422B on the surface 108 of the waveguide 422B is configured to have a low reflectance of no more than 2% for low angles (e.g., angle of less than 25 degrees) relative to the normal, and have a high reflectance of at least 50% for high angles (e.g., angles of at least 30 degrees) relative to the normal, for light within the blue wavelength range (e.g., from 430 nm to 480 nm). Preferably, the high reflectance for high angles is at least 75%, and even more preferably is at least 90%.

The coating 422G on the surface 108 of the waveguide 422G is configured to have a low reflectance of no more than 2% for low angles (e.g., angle of less than 25 degrees) relative to the normal, and have a high reflectance of at least 50% for high angles (e.g., angles of at least 30 degrees) relative to the normal, for light within the green wavelength range (e.g., from 500 nm to 550 nm). Preferably, the high reflectance for high angles is at least 75%, and even more preferably is at least 90%.

The coating 422R on the surface 108 of the waveguide 422R is configured to have a low reflectance of no more than 2% for low angles (e.g., angle of less than 25 degrees) relative to the normal, and have a high reflectance of at least 50% for high angles (e.g., angles of at least 30 degrees) relative to the normal, for light within the red wavelength range (e.g., from 600 nm to 650 nm). Preferably, the high reflectance for high angles is at least 75%, and even more preferably is at least 90%.

In the description herein, low angles are considered angles below a low angle threshold, and high angles are considered angles above a high angle threshold. In accordance with certain embodiments described herein, the low angle threshold is no more than 25 degrees relative to a normal, and the high angle threshold is at least 30 degrees relative to a normal. In certain embodiments, the low angle threshold can be 20 degrees, 15 degrees, or some other angle below 25 degrees relative to a normal to a surface. In certain embodiments, the high angle threshold can be 32 degrees, or 35 degrees, or some other angle above 30 degrees relative to a normal to a surface.

The coating 422B can additionally, or alternatively, be applied to the other major surface 110 of the waveguide 422B. The coating 422G can additionally, or alternatively, be applied to the other major surface 110 of the waveguide 422G. The coating 422R can additionally, or alternatively, be applied to the other major surface 110 of the waveguide 422R. While the coatings 422B, 422G and 422R are showed as being located, respectively, on at least one of the major surfaces of the waveguides 100B, 100G and 100R, it is possible that only one or two of the waveguides 100 includes such a coating on one or both of its major surfaces.

Each coating 422 applied to one (or both) of the major surfaces (108 and/or 110) of a waveguide 100 can have a preferential linear polarization for which the coating is configured to have a low reflectance (e.g., of no more than 2 percent) for light below a low threshold angle (e.g., of no more than 25 degrees relative to a normal) and a high reflectance (e.g., of at least 50 percent) for light above a high threshold angle (e.g., of at least 30 degrees relative to the normal). The preferential linear polarization orientation can either be a P linear polarization orientation, or an S linear polarization orientation, which orientations are orthogonal relative to one another. It is also possible that the preferential linear polarization orientation of a coating 422 can be a polarization that is neither a P linear polarization orientation, nor an S linear polarization orientation, but rather, is a polarization orientation that is oriented somewhere between the S and P linear polarization orientations. The P linear polarization orientation is also known as transverse-magnetic (TM), and the S linear polarization orientation is also known as transverse-electric (TE), as noted above. It is also possible that the preferential linear polarization is a circular polarization, which has components of both S- and P-polarizations, that are out of phase with one another. Other variations are also possible.

The coatings 422R, 422G and 422B can be collectively referred to as the coatings 422, or individually referred to as a coating 422. Each of the coatings 422 can be a multi-layer coating that includes at least ten layers of dielectric material, and may include twenty or more layers of dielectric material. Each of the coatings 422 can includes alternating layers of two or more different dielectric materials having different indices of refraction between 1.3 and 2.2. Examples of such dielectric materials include, but are not limited to, silicon dioxide (SiO2), titanium dioxide (TiO2) and aluminum oxide (Al2O3). In certain embodiments, a coating 422 includes alternating layers of silicon dioxide and titanium dioxide. In other embodiments, a coating 422 includes alternating layers of silicon dioxide and aluminum oxide. In still other embodiments, a coating 422 includes alternating layers of silicon dioxide, titanium dioxide and aluminum oxide.

Other exemplary dielectric materials that can be included in one or more of the coatings 422 include, but are not limited to, silicon hydride (SixHy), silicon nitride (SixNy), silicon oxynitride (SixOzNy), tantalum oxide (TaxOy), gallium arsenide (GaAs), gallium nitride (GaN). It is also possible that one or more layers of the coating 422 is/are metallic layers that are non-dielectric. Chemical and/or physical deposition techniques can be used to deposit the materials that make up the coating 422 on a major surface of a waveguide 100 to form the coating 422. Exemplary chemical deposition techniques that can be used include, but are not limited to, chemical solution deposition (CSD), spin coating, chemical vapor deposition (CVD), plasma enhance CVD (PECFC) and atomic layer deposition (ALD). Exemplary physical deposition techniques that can be used include, but are not limited to, physical vapor deposition (PVD), molecular beam opitaxy (MBE), sputtering, pulsed laser deposition (PLD), cathodic arc deposition (arc-PVD) and electrohydrodynamic deposition.

Figure 5:
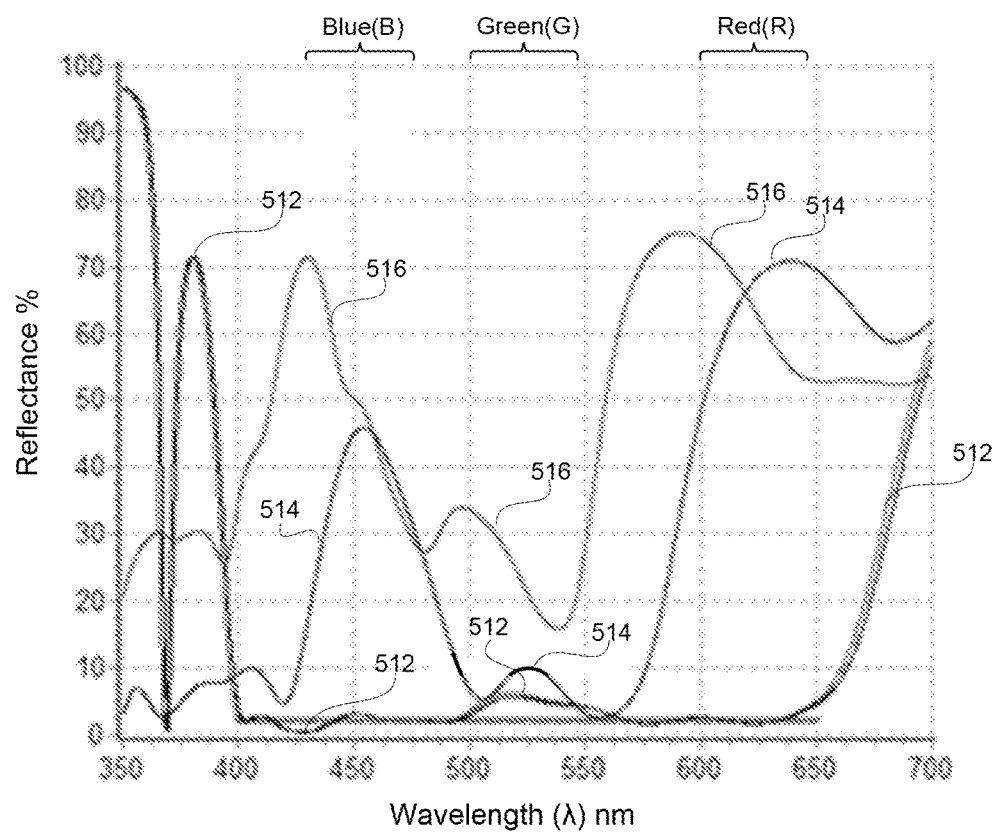
FIG. 5 is a graph that illustrates the reflectance percentage (%) at a glass-to-air medium boundary of an optical waveguide having a coating that is configured to have a low reflectance for low angles relative to the normal, and have a high reflectance for high angles relative to the normal.

FIG. 5 is a graph that illustrates the reflectance %, at a glass-to-air medium boundary of a waveguide 100 coated with an exemplary implementation of the coating 422, for light traveling at different angles relative to the normal to the surface 108 of the waveguide 100 as a function of wavelength, wherein the critical angle for the glass-to-air medium boundary is assumed to be 36 degrees. More specifically, the plotted line 512, which corresponds to light traveling at 5 degrees relatively to the normal of the major planar surface 108 of the waveguide 100, illustrates that light of such a low angle (relative to the critical angle) has an average reflectance of no greater than 2% within the visible wavelength range from 400 nm to 650 nm. The plotted line 514, which corresponds to light traveling at 30 degrees relatively to the normal of the major planar surface 108 of the waveguide 100, illustrates that light of such a high angle (that is close to the critical angle) has an average reflectance ranging from about 5% to about 71% within the visible wavelength range from 400 nm to 650 nm (which includes red, green and blue wavelength ranges). More specifically, the plotted line 514 illustrates that blue light (within a blue wavelength range from 430 nm to 480 nm) traveling at 30 degrees relatively to the normal of the major planar surface 108 of the waveguide 100 will have an average reflectance of about 32%, green light (within a green wavelength range from 500 nm to 550 nm) will have an average reflectance of about 7%, and red light (within the red wavelength range is from 600 nm to 650 nm) will have an average reflectance of about 60%.

The plotted line 516, which corresponds to light traveling at 35 degrees relatively to the normal of the major planar surface 108 of the waveguide 100, illustrates that light at such a high angle (that is even closer to the critical angle) has an average reflectance ranging from about 25% to about 75% within the visible wavelength range from 400 nm to 650 nm. More specifically, the plotted line 516 illustrates that blue light (within a blue wavelength range from 430 nm to 480 nm) traveling at 35 degrees relatively to the normal of the major planar surface 108 of the waveguide 100 will have an average reflectance of about 50%, green light (within a green wavelength range from 500 nm to 550 nm) will have an average reflectance of about 25%, and red light (within the red wavelength range is from 600 nm to 650 nm) will have an average reflectance of about 61%.

Overall, the graph in FIG. 5 shows that where a waveguide is coated with an embodiment of the coating 422, visible light having low angles will have a very low reflectance (of 2% or less), and visible light having higher angles that approach the critical angle (and thus, approach the TIR limit) will have a reflectance ranging from about 25% to about 75%, depending on the specific wavelength of the visible light. The specific coating 422 whose characteristics are shown in FIG. 5 may be most suitable for use as the coating on the waveguide 100R, since this exemplary coating provides a very low reflectance (of 2% or less) for red light having low angles, and a high reflectance (of greater than 50%) for red light having higher angles that approach the critical angle (and thus, approach the TIR limit). The coating 422 can be further optimized, e.g., by adding further layers of dielectric and/or non-dielectric materials, to increase the reflectance to 75%, or even up to 90%, for red light having high angles that approach the critical angle (and thus, approach the TIR limit).

Each separate waveguide 100 can be coated with its own separate coating 422 specifically designed for the visible wavelength range of light for which the waveguide 100 will transfer light corresponding to an image from its input-coupler 112 to its output-coupler 116. For example, a further coating can be designed for the waveguide 1000 that provides a very low reflectance (of 2% or less) for green light having low angles, and a high reflectance (of greater than 50%, 75% or 90%) for green light having higher angles that approach the critical angle (and thus, approach the TIR limit). Another coating can be designed for the waveguide 100B that provides a very low reflectance (of 2% or less) for blue light having low angles, and a high reflectance (of greater than 50%, 75% or 90%) for blue light having higher angles that approach the critical angle (and thus, approach the TIR limit).

A benefit of a waveguide coating 422 having a very low reflectance (e.g., of 2% or less) for light within a specified wavelength range that has low angles (i.e., angles below a low threshold angle that is no more than 25 degrees relative to a normal), is that it permits external light corresponding to a real world image to pass through the waveguide, so that the user can view a real world image that is being augmented by a virtual image that the waveguide(s) 100 is/are being used to display. Another benefit is that it reduces the presence or intensity of a ghost image of such a real world image.

A benefit of the same waveguide coating 422 having a high reflectance (of greater than 50%, and more preferably of at least 75%, and even more preferably of at least 90%) for light within the same specified wavelength range that has high angles (i.e., angles above a high threshold angle that is at least 30 degrees relative to the normal) that approach the critical angle, and thus, approach the TIR limit, is that it reduces the amount of light that undesirably leaks out of the waveguide while traveling from an input-coupler to an output-coupler of the waveguide by way of TIR. This is beneficial because it reduces an overall loss in intensity, reduces dark spots in a viewed image, reduces ghost images, and more generally, reduces the loss of some of the full image content that may occur when light undesirably leaks out of a waveguide while traveling from an input-coupler to an output-coupler of the waveguide by way of TIR.

In FIGS. 2 and 4, the waveguide assembly 200 was shown and described as including the waveguide 100R for guiding red light within a red wavelength range, the waveguide 100G for guiding green light within a green wavelength range, and the waveguide 100B for guiding blue light within a blue wavelength range. In alternative embodiments, a first waveguide may guide both blue and green light, while a second waveguide guides the red light. In such an embodiment, an input-coupler would be configured to couple both blue and green light into a waveguide, and an output-coupler would be configured to couple both blue and green light out of the waveguide. This is just an example, as other variations are also possible and within the scope of the embodiments of the present technology. In an embodiment where a waveguide 100 guides light of more than one color, e.g., green and blue light, the coating 422 added to a major surface of the waveguide 100 should be designed to have a very low reflectance (of 2% or less) for green and blue light having low angles, and a high reflectance (of greater than 50%, 75% or 90%) for green and blue light having higher angles that approach the critical angle (and thus, approach the TIR limit). It is also possible that a waveguide assembly includes more than three waveguides 100, e.g., where the display engine produces light of more than three distinct wavelength ranges. In such a case, one or more waveguide can include a coating specifically configured for the specific wavelength range of the light being transferred by the waveguide.

As noted above, each coating 422 (e.g., 422R, 422G and 422B) can be can includes alternating layers of two or more different materials (e.g., silicon dioxide, titanium dioxide and/or aluminum oxide) having different indices of refraction, e.g., between 1.3 and 2.2. By careful choice of the exact composition, thickness, and number of these layers, it is possible to tailor the reflectivity of the coating to produce almost any desired spectral characteristics. For example, the level of reflectivity can also be tuned to any particular value, for instance to produce a mirror that reflects 90% and transmits 10% of the light that is incident on it, over some range of angles and wavelengths. Generally, layers of high and low refractive index materials are alternated one above the other. This periodic or alternating structure significantly enhances the reflectivity of the surface in the certain wavelength range called band-stop, which width is determined by the ratio of the two used indices only (for quarter-wave system). By manipulating the exact thickness and composition of the layers in the stack of materials having different indices of refraction, the reflection characteristics can be tuned to a desired spectral response, and may incorporate both high-reflective and anti-reflective wavelength regions. The coating can be designed as a long-pass or short-pass filter, a bandpass or notch filter, or a mirror with a specific reflectivity.

Figure 6A:
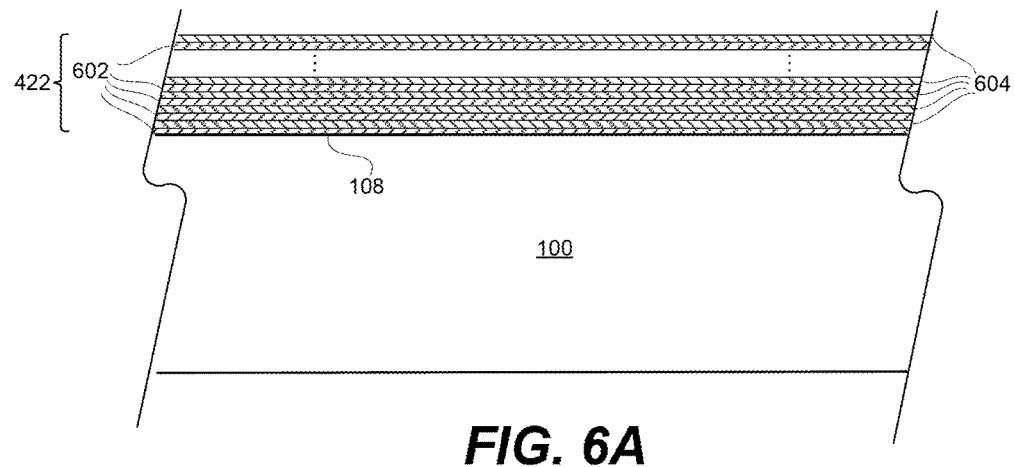
FIG. 6A illustrates an exemplary coating that includes alternating layers of two different materials on a major surface of an optical waveguide.
Figure 6B:
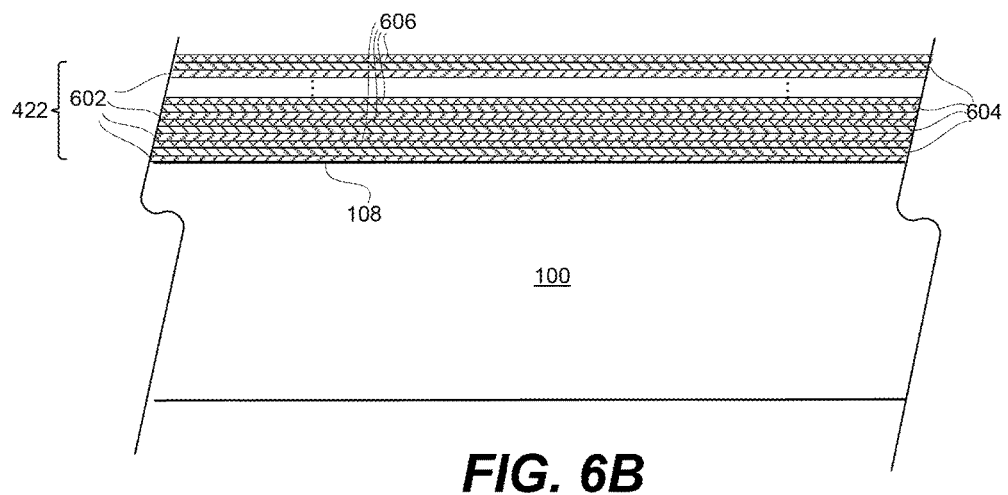
FIG. 6B illustrates an exemplary coating that includes alternating layers of three different materials on a major surface of an optical waveguide.

FIG. 6A illustrates an exemplary coating 422 that includes alternating layers of two different materials 602 and 604 having different indices of refraction than one another. FIG. 6B illustrates an exemplary coating 422 that includes alternating layers of three different materials 602, 604 and 606 having different indices of refraction than one another. It is also within the scope of embodiments described herein for the coating 422 to include alternating layers of more than three different materials having different indices of refraction than one another. Exemplary dielectric and non-dielectric materials that could be used to produce the coating(s) 422 were described above, and thus, need not be repeated.

It is noted that FIGS. 6A and 6B, and the other FIGS., are not drawn to scale. For example, thickness of each of the materials that make up the coatings 422 shown in FIG. 6A and 6b are not drawn to scale (and are likely thinner than shown) relative to the thickness of the waveguide 100.

Figure 7:
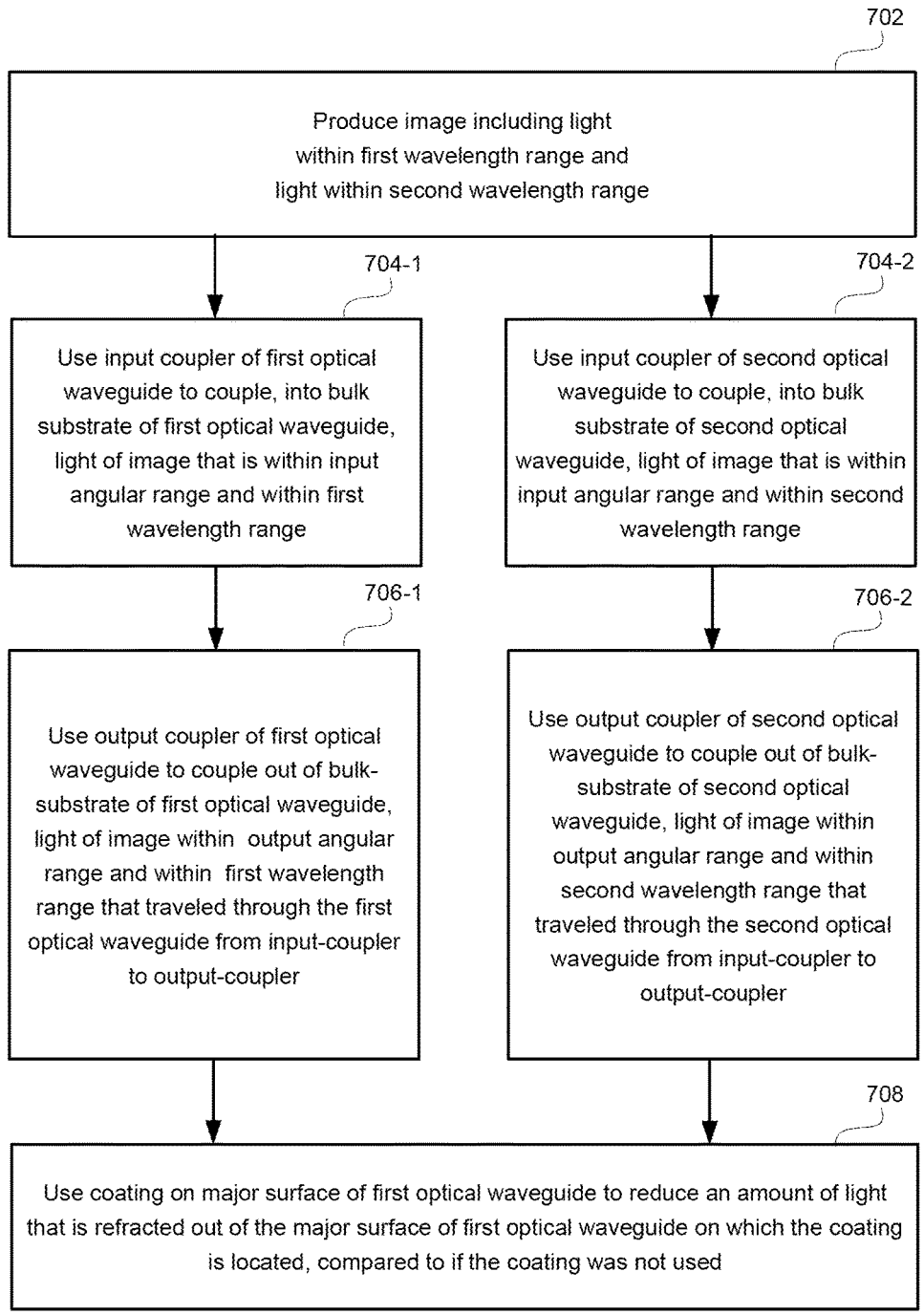
FIG. 7 is a high level flow diagram that is used to summarize methods according to certain embodiments of the present technology.

FIG. 7 is a high level flow diagram that is used to summarize methods according to various embodiments of the present technology. Such methods can be for use with a near eye or heads up display system that includes at least two optical waveguides (referenced as first and second optical waveguides) that are next to one another and each of which includes a bulk-substrate having a pair of opposing major planar surfaces, an input-coupler and an output-coupler.

Referring to FIG. 7, step 702 involves producing an image including light within a first wavelength range and light within a second wavelength range that differs from the first wavelength range.

Step 704-1 involves using the input-coupler of the first optical waveguide to couple, into the bulk substrate of the first optical waveguide, light of the image that is within an input angular range and within the first wavelength range. Step 704-2 involves using the input-coupler of the second optical waveguide to couple, into the bulk substrate of the second optical waveguide, light of the image that is within the input angular range and within the second wavelength range.

Step 706-1 involves using the output-coupler of the first optical waveguide to couple out of the bulk-substrate of the first optical waveguide, light of the image within an output angular range and within the first wavelength range that traveled through the first optical waveguide from the input-coupler to the output-coupler at least in part by way of TIR. Step 706-2 involves using the output-coupler of the second optical waveguide to couple out of the bulk-substrate of the second optical waveguide, light of the image within the output angular range and within the second wavelength range that traveled through the second optical waveguide from the input-coupler to the output-coupler at least in part by way of TIR.

Step 708 involves using a coating on one of the major surfaces of the first optical waveguide to reduce an amount of light that is refracted out of the one of the major surfaces of the first optical waveguide on which the coating is located, compared to if the coating was not used. In accordance with an embodiment, the coating has a low reflectance of no more than 2 percent for light within the first wavelength range that is traveling within the bulk-substrate of the first optical waveguide and is incident on the one of the first and second major surfaces of the first optical waveguide on which the coating is located at an angle below a low threshold angle that is no more than 25 degrees relative to a normal. Further, the coating is configured to have a high reflectance of at least 50 percent for light within the first wavelength range that is traveling within the bulk-substrate of the first optical waveguide and is incident on the one of the first and second major surfaces of the first optical waveguide on which the coating is located at an angle above a high threshold angle that is at least 30 degrees relative to the normal.

In accordance with an embodiment, one of the first and second wavelength ranges includes both a green wavelength range and a blue wavelength range, and the other one of the first and second wavelength ranges is a red wavelength range.

In accordance with another embodiment, one of the first and second wavelength ranges is one of a red wavelength range, a green wavelength range or a blue wavelength range, and the other one of the first and second wavelength ranges is a different one of the red wavelength range, the green wavelength range or the blue wavelength range. Other variations are possible, and within the scope of the embodiments of the present technology described herein.

In accordance with an embodiment, the coating on the one of the major surfaces of the first optical waveguide is a first coating, and the method further includes using a second coating on one of the major surfaces of the second optical waveguide to reduce an amount of light that is refracted out of the one of the major surfaces of the second optical waveguide on which the second coating is located, compared to if the second coating was not used. In accordance with an embodiment, the second coating has a low reflectance of no more than 2 percent for light within the second wavelength range that is traveling within the bulk-substrate of the second optical waveguide and is incident on the one of the major surfaces of the second optical waveguide on which the second coating is located at an angle below the low threshold angle that is no more than 25 degrees relative to a normal. Further, the second coating is configured to have a high reflectance of at least 50 percent for light within the second wavelength range that is traveling within the bulk-substrate of the second optical waveguide and is incident on the one of the major surfaces of the second optical waveguide on which the second coating is located at an angle above a high threshold angle that is at least 30 degrees relative to the normal.

In certain embodiments, the near eye or heads up display system also includes a third optical waveguide arranged next to the second optical waveguide, the third optical waveguide including a bulk-substrate, an input-coupler and an output-coupler. Such embodiments can include using the input-coupler of the third optical waveguide to couple, into the bulk substrate of the third optical waveguide, light of the image that is within the input angular range and within the third wavelength range. Such embodiments can also include using the output-coupler of the third optical waveguide to couple out of the bulk-substrate of the third optical waveguide, light of the image within the output angular range and within the third wavelength range that traveled through the third optical waveguide from the input-coupler to the output-coupler at least in part by way of TIR. In accordance with an embodiment, the method also includes using a third coating on one of the major surfaces of the third optical waveguide to reduce an amount of light that is refracted out of the one of the major surfaces of the third optical waveguide on which the third coating is located, compared to if the third coating was not used. In accordance with an embodiment, the third coating has a low reflectance of no more than 2 percent for light within the third wavelength range that is traveling within the bulk-substrate of the third optical waveguide and is incident on the one of the major surfaces of the third optical waveguide on which the third coating is located at an angle below the low threshold angle that is no more than 25 degrees relative to a normal. Further, the third coating is configured to have a high reflectance of at least 50 percent for light within the third wavelength range that is traveling within the bulk-substrate of the third optical waveguide and is incident on the one of the major surfaces of the third optical waveguide on which the third coating is located at an angle above the high threshold angle that is at least 30 degrees relative to the normal.

In the above description and the FIGS. described therein, the waveguides 100 were typically described and shown as being planar waveguides that each include a pair of planar opposing main surfaces. In an alternative embodiment, one or both of the main surfaces of a waveguide could be non-planar, e.g., curved. In the above description and the FIGS. described therein, the waveguides 100 were typically described and shown as being parallel to one another, however that need not be the case.

In the above description, the display engine 204 was described as outputting red, green and blue light corresponding to an image, and the waveguides 100 were described as transferring the red, green and blue light from the input-couplers 112 to the output-couplers 116 of the various waveguides 100, and more generally, from an input-pupil to an output-pupil. However, it is also within the scope of the present technology that the light output by the display engine 204 include alternative colors, such as, but not limited to, cyan, magenta and yellow, in which cases the input-couplers 112, output-couplers 116 and coating(s) 422 would be designed for such alternative wavelength ranges. It is also within the scope of the present technology that more than three colors of light be output by the display engine 204, e.g., the display engine 204 can output red, green, blue and yellow light corresponding to an image. In this latter case, an additional waveguide can be used to guide the yellow light, or the yellow light can be guided within one of the waveguides that also guides one of the other colors. Other variations are possible and within the scope of the present technology.

In accordance with certain embodiments described herein, a near eye or heads up display system includes a display engine and a waveguide assembly. The display engine is configured to produce an image including light within a first wavelength range and light within a second wavelength range that differs from the first wavelength range. The waveguide assembly includes first and second optical waveguides arranged next to one another, wherein each of the first and second optical waveguides includes a bulk-substrate, an input-coupler and an output-coupler. The bulk-substrate of each of the optical waveguides includes a first major surface and a second major surface opposite and the first major surface. The input-coupler of the first optical waveguide is configured to couple, into the bulk substrate of the first optical waveguide, light of the image produced by the display engine that is within an input angular range and within the first wavelength range. The input-coupler of the second optical waveguide is configured to couple, into the bulk substrate of the second optical waveguide, light of the image produced by the display engine that is within the input angular range and within the second wavelength range. The output-coupler of the first optical waveguide is configured to couple, out of the bulk-substrate of the first optical waveguide, light of the image within an output angular range and within the first wavelength range that travels through the first optical waveguide from the input-coupler to the output-coupler at least in part by way of TIR. The output-coupler of the second optical waveguide is configured to couple, out of the bulk-substrate of the second optical waveguide, light of the image within the output angular range and within the second wavelength range that travels through the second optical waveguide from the input-coupler to the output-coupler of the second optical waveguide at least in part by way of TIR. The output angular range can be substantially the same as the input angular range, and more specifically, the input angular range and the output angular range can each be approximately +/−15 degrees relative to the normal. Alternative angular ranges for the input-couplers and output-couplers are also possible.

In accordance with certain embodiments, the near eye or heads up display system also includes a coating on one of the first and second major surfaces of the first optical waveguide that is closest to the second optical waveguide. The coating is configured to have a low reflectance of no more than 2 percent for light within the first wavelength range that is traveling within the bulk-substrate of the first optical waveguide and is incident on the one of the first and second major surfaces of the first optical waveguide on which the coating is located at an angle below a low threshold angle that is no more than 25 degrees relative to a normal. Additionally, the coating is configured to have a high reflectance of at least 50 percent for light within the first wavelength range that is traveling within the bulk-substrate of the first optical waveguide and is incident on the one of the first and second major surfaces of the first optical waveguide on which the coating is located at an angle above a high threshold angle that is at least 30 degrees relative to the normal. In accordance with certain embodiments, the coating includes alternating layers of two or more different materials having different indices of refraction between 1.3 and 2.2. At least some of the alternating layers of the two or more different materials, which have different indices of refraction between 1.3 and 2.2, have different thicknesses than one another, the thickness selected to provide the desired properties, namely, the low reflectance of no more than 2 percent for light within the first wavelength range that is incident on the one of the first and second major surfaces of the first optical waveguide on which the coating is located at an angle below the low threshold angle, and the high reflectance of at least 50 percent for light within the first wavelength range that is incident on the one of the first and second major surfaces of the first optical waveguide on which the coating is located at an angle above the high threshold angle. Such a coating can include alternating layers of silicon dioxide and titanium dioxide, alternating layers of silicon dioxide and aluminum oxide, or alternating layers of silicon dioxide, titanium dioxide and aluminum oxide, but is not limited thereto.

Where a coating is on one of the major surfaces of a waveguide, the coating can also be on the other major surface. In other words, stating that a coating is on one major surface is not meant to indicate that the coating may not also be on the other major surface. According, a coating on one of two major surfaces means that the coating is on at least one of the two major surfaces, unless stated otherwise.

In accordance with certain embodiments, the coating is configured to have a high reflectance of at least 75 percent (or an even higher percent) for light within the first wavelength range that is traveling within the bulk-substrate of the first optical waveguide and is incident on the one of the first and second major surfaces of the first optical waveguide on which the coating is located at an angle above the high threshold angle that is at least 30 degrees relative to the normal.

In accordance with certain embodiments, the coating has a preferential polarization orientation that enables the coating to have the low reflectance of no more than 2 percent for light within the first wavelength range that is traveling within the bulk-substrate of the first optical waveguide and is incident on the one of the first and second major surfaces of the first optical waveguide on which the coating is located at an angle below a low threshold angle that is no more than 25 degrees relative to a normal, and enables the coating on the one of the first and second major surfaces of the first optical waveguide to have the high reflectance of at least 50 percent for light within the first wavelength range that is traveling within the bulk-substrate of the first optical waveguide and is incident on the one of the first and second major surfaces of the first optical waveguide on which the coating is located at an angle above a high threshold angle that is at least 30 degrees relative to the normal.

In accordance with an embodiment, one of the first and second wavelength ranges comprises both a green wavelength range and a blue wavelength range, and the other one of the first and second wavelength ranges comprises a red wavelength range. In accordance with another embodiments, one of the first and second wavelength ranges comprises one of a red wavelength range, a green wavelength range or a blue wavelength range, and the other one of the first and second wavelength ranges comprises a different one of the red wavelength range, the green wavelength range or the blue wavelength range. Other variations are possible, and within the scope of the embodiments described herein.

The second waveguide can also have a coating, which can be referred to as a second coating, on one of the first and second major surfaces of the second optical waveguide. In such an embodiment, the second coating can be configured to have a low reflectance of no more than 2 percent for light within the second wavelength range that is traveling within the bulk-substrate of the second optical waveguide and is incident on the one of the first and second major surfaces of the second optical waveguide on which the second coating is located at an angle below the low threshold angle that is no more than 25 degrees relative to a normal. Additionally, the second coating can be configured to have a high reflectance of at least 50 percent for light within the second wavelength range that is traveling within the bulk-substrate of the second optical waveguide and is incident on the one of the first and second major surfaces of the second optical waveguide on which the second coating is located at an angle above the high threshold angle that is at least 30 degrees relative to the normal.

In accordance with certain embodiments, the image produced by the display engine also include light within a third wavelength range (that differs from the first and second wavelength ranges), and the waveguide assembly also includes a third optical waveguide arranged next to the second optical waveguide, wherein the third optical waveguide includes a bulk-substrate, an input-coupler and an output-coupler. In such embodiments, the input-coupler of the third optical waveguide is configured to couple, into the bulk substrate of the third optical waveguide, light of the image produced by the display engine that is within the input angular range and within the third wavelength range. Further, the output-coupler of the third optical waveguide is configured to couple, out of the bulk-substrate of the third optical waveguide, light of the image within the output angular range and within the third wavelength range that travels through the third optical waveguide from the input-coupler to the output-coupler at least in part by way of TIR. In such embodiments, there can also be a third coating on one of the first and second major surfaces of the third optical waveguide. The third coating is configured to have a low reflectance of no more than 2 percent for light within the third wavelength range that is traveling within the bulk-substrate of the third optical waveguide and is incident on the one of the first and second major surfaces of the third optical waveguide on which the third coating is located at an angle below the low threshold angle that is no more than 25 degrees relative to a normal. Additionally, the third coating is configured to have a high reflectance of at least 50 percent for light within the third wavelength range that is traveling within the bulk-substrate of the third optical waveguide and is incident on the one of the first and second major surfaces of the third optical waveguide on which the third coating is located at an angle above the high threshold angle that is at least 30 degrees relative to the normal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   an optical waveguide including a bulk-substrate, an input-coupler and an output-coupler;
   the bulk-substrate of the optical waveguide including a first major surface and a second major surface opposite and the first major surface;
   the input-coupler of the optical waveguide configured to couple, into the bulk substrate of the optical waveguide, light that is within an input angular range and within a first wavelength range;
   the output-coupler of the optical waveguide configured to couple, out of the bulk-substrate of the optical waveguide, light within an output angular range and within the first wavelength range that travels through the optical waveguide from the input-coupler to the output-coupler at least in part by way of total internal reflection (TIR);
   a coating on one of the first and second major surfaces of the optical waveguide;
   the coating configured to have a low reflectance of no more than 2 percent for light within the first wavelength range that is traveling within the bulk-substrate of the optical waveguide and is incident on the one of the first and second major surfaces of the optical waveguide on which the coating is located at each angle below a low threshold angle of no more than 25 degrees relative to a normal of the one of the first and second major surfaces of the optical waveguide on which the coating is located; and
   the coating configured to have a high reflectance of at least 50 percent for light within the first wavelength range that is traveling within the bulk-substrate of the optical waveguide and is incident on the one of the first and second major surfaces of the optical waveguide on which the coating is located at each angle above a high threshold angle of at least 30 degrees relative relative to the normal of the one of the first and second major surfaces of the optical waveguide on which the coating is located.

2. The apparatus of claim 1, wherein the coating includes alternating layers of two or more different materials having different indices of refraction between 1.3 and 2.2.

3. The apparatus of claim 2, wherein at least some of the alternating layers of the two or more different materials, which have different indices of refraction between 1.3 and 2.2, have different thicknesses than one another, the thickness selected to provide:
   the low reflectance of no more than 2 percent for light within the first wavelength range that is incident on the one of the first and second major surfaces of the optical waveguide on which the coating is located at each angle below the low threshold angle of no more than 25 degrees relative to the normal of the one of the first and second major surfaces of the optical waveguide on which the coating is located, and
   the high reflectance of at least 50 percent for light within the first wavelength range that is incident on the one of the first and second major surfaces of the optical waveguide on which the coating is located at each angle above the high threshold angle of at least 30 degrees relative to the normal of the one of the first and second major surfaces of the optical waveguide on which the coating is located.

4. The apparatus of claim 1, wherein the coating includes:
alternating layers of silicon dioxide and titanium dioxide;
alternating layers of silicon dioxide and aluminum oxide; or
alternating layers of silicon dioxide, titanium dioxide and aluminum oxide.

5. The apparatus of claim 1, wherein the high reflectance is of at least 75 percent for light within the first wavelength range that is traveling within the bulk-substrate of the optical waveguide and is incident on the one of the first and second major surfaces of the optical waveguide on which the coating is located at each angle above the high threshold angle of at least 30 degrees relative relative to the normal of the one of the first and second major surfaces of the optical waveguide on which the coating is located.

6. The apparatus of claim 1, wherein the coating on the one of the first and second major surfaces of the optical waveguide has a preferential polarization orientation that enables the coating to have the low reflectance of no more than 2 percent for light within the first wavelength range that is traveling within the bulk-substrate of the optical waveguide and is incident on the one of the first and second major surfaces of the optical waveguide on which the coating is located at each angle below the low threshold angle that is no more than 25 degrees relative to the normal of the one of the first and second major surfaces of the optical waveguide on which the coating is located, and enables the coating on the one of the first and second major surfaces of the optical waveguide to have the high reflectance of at least 50 percent for light within the first wavelength range that is traveling within the bulk-substrate of the optical waveguide and is incident on the one of the first and second major surfaces of the optical waveguide on which the coating is located at each angle above the high threshold angle that is at least 30 degrees relative to the normal of the one of the first and second major surfaces of the optical waveguide on which the coating is located.

7. The apparatus of claim 1, wherein the first wavelength range comprises one of a red wavelength range, a green wavelength range or a blue wavelength range.

8. The apparatus of claim 1, wherein the first wavelength range comprises both a green wavelength range and a blue wavelength range.

9. The apparatus of claim 1, wherein the optical waveguide comprises a first optical waveguide and the coating comprises a first coating, and wherein the apparatus further comprises:
a display engine configured to produce an image including light within the first wavelength range and light within a second wavelength range that differs from the first wavelength range, and wherein:
a second optical waveguide next to the first optical waveguide, the second optical waveguide including a bulk-substrate, an input-coupler and an output-coupler;
the bulk-substrate of the second optical waveguide including a first major surface and a second major surface opposite and the first major surface;
the input-coupler of the second optical waveguide configured to couple, into the bulk substrate of the second optical waveguide, light of the image produced by the display engine that is within the input angular range and within the second wavelength range;
the output-coupler of the second optical waveguide configured to couple, out of the bulk-substrate of the second optical waveguide, light of the image within the output angular range and within the second wavelength range that travels through the second optical waveguide from the input-coupler to the output-coupler of the second optical waveguide at least in part by way of TIR; and
wherein the first coating is on the one of the first and second major surfaces of the first optical waveguide that is closest to the second optical waveguide.

10. The apparatus of claim 9, wherein:
the image produced by the display engine also includes light within a third wavelength range that differs from the first and second wavelength ranges;
the first and second optical waveguides are part of a waveguide assembly that also includes a third optical waveguide arranged next to the second optical waveguide;
the third optical waveguide includes a bulk-substrate, an input-coupler and an output-coupler;
the input-coupler of the third optical waveguide is configured to couple, into the bulk substrate of the third optical waveguide, light of the image produced by the display engine that is within the input angular range and within the third wavelength range; and
the output-coupler of the third optical waveguide is configured to couple, out of the bulk-substrate of the third optical waveguide, light of the image within the output angular range and within the third wavelength range that travels through the third optical waveguide from the input-coupler to the output-coupler at least in part by way of TIR;
further comprising a second coating on one of the first and second major surfaces of the second optical waveguide, and a third coating on one of the first and second major surfaces of the third optical waveguide;
the first coating configured to have the low reflectance of no more than 2 percent for light within the first wavelength range that is traveling within the bulk-substrate of the first optical waveguide and is incident on the one of the first and second major surfaces of the first optical waveguide on which the coating is located at each angle below the low threshold angle that is no more than 25 degrees relative to the normal of the one of the first and second major surfaces of the first optical waveguide on which the first coating is located;
the first coating configured to have the high reflectance of at least 50 percent for light within the first wavelength range that is traveling within the bulk-substrate of the first optical waveguide and is incident on the one of the first and second major surfaces of the first optical waveguide on which the coating is located at each angle above the high threshold angle that is at least 30 degrees relative to the normal of the one of the first and second major surfaces of the first optical waveguide on which the coating is located;
the second coating configured to have the low reflectance of no more than 2percent for light within the second wavelength range that is traveling within the bulk-substrate of the second optical waveguide and is incident on the one of the first and second major surfaces of the second optical waveguide on which the second coating is located at each angle below the low threshold angle that is no more than 25 degrees relative to a normal of the one of the first and second major surfaces of the second optical waveguide on which the second coating is located;
the second coating configured to have the high reflectance of at least 50 percent for light within the second wavelength range that is traveling within the bulk-substrate of the second optical waveguide and is incident on the one of the first and second major surfaces of the second optical waveguide on which the second coating is located at each angle above the high threshold angle that is at least 30 degrees relative to the normal of the one of the first and second major surfaces of the second optical waveguide on which the second coating is located;

the third coating configured to have the low reflectance of no more than 2 percent for light within the third wavelength range that is traveling within the bulk-substrate of the third optical waveguide and is incident on the one of the first and second major surfaces of the third optical waveguide on which the third coating is located at each angle below the low threshold angle that is no more than 25 degrees relative to a normal of the one of the first and second major surfaces of the third optical waveguide on which the third coating is located; and the third coating configured to have the high reflectance of at least 50 percent for light within the third wavelength range that is traveling within the bulk-substrate of the third optical waveguide and is incident on the one of the first and second major surfaces of the third optical waveguide on which the third coating is located at each angle above the high threshold angle that is at least 30 degrees relative to the normal of the one of the first and second major surfaces of the third optical waveguide on which the third coating is located.

11. The apparatus of claim 1, wherein:
the output angular range is substantially the same as the input angular range; and
the input angular range and the output angular range are each approximately +/−15 degrees relative to the normal.

12. The apparatus of claim 1, wherein:
the high threshold angle is 30 degrees relative to the normal of the one of the first and second major surfaces of the optical waveguide on which the coating is located; and
the coating is configured to have the high reflectance of at least 50 percent for light within the first wavelength range that is traveling within the bulk-substrate of the optical waveguide that is incident on the one of the first and second major surfaces of the optical waveguide on which the coating is located at each angle above 30 degrees relative relative to the normal of the one of the first and second major surfaces of the optical waveguide on which the coating is located.

13. A method for use with a near eye or heads up display system that includes first and second optical waveguides that are next to one another and each of which includes a bulk-substrate having a pair of opposing major planar surfaces, an input-coupler and an output-coupler, the method comprising:
producing an image including light within a first wavelength range and light within a second wavelength range that differs from the first wavelength range;
using the input-coupler of the first optical waveguide to couple, into the bulk substrate of the first optical waveguide, light of the image that is within an input angular range and within the first wavelength range;
using the input-coupler of the second optical waveguide to couple, into the bulk substrate of the second optical waveguide, light of the image that is within the input angular range and within the second wavelength range;
using the output-coupler of the first optical waveguide to couple out of the bulk-substrate of the first optical waveguide, light of the image within an output angular range and within the first wavelength range that traveled through the first optical waveguide from the input-coupler to the output-coupler at least in part by way of total internal reflection (TIR);
using the output-coupler of the second optical waveguide to couple out of the bulk-substrate of the second optical waveguide, light of the image within the output angular range and within the second wavelength range that traveled through the second optical waveguide from the input-coupler to the output-coupler at least in part by way of TIR; and
using a coating on one of the major surfaces of the first optical waveguide to reduce an amount of light that is refracted out of the one of the major surfaces of the first optical waveguide on which the coating is located, compared to if the coating was not used;
the coating having a low reflectance of no more than 2 percent for light within the first wavelength range that is traveling within the bulk-substrate of the first optical waveguide and is incident on the one of the first and second major surfaces of the first optical waveguide on which the coating is located at each angle below a low threshold angle of no more than 25 degrees relative to a normal of the one of the first and second major surfaces of the first optical waveguide on which the coating is located; and
the coating having a high reflectance of at least 50 percent for light within the first wavelength range that is traveling within the bulk-substrate of the first optical waveguide and is incident on the one of the first and second major surfaces of the first optical waveguide on which the coating is located at each angle above a high threshold angle of at least 30 degrees relative to the normal of the one of the first and second major surfaces of the first optical waveguide on which the coating is located.

14. The method of claim 13, wherein:
one of the first and second wavelength ranges comprises both a green wavelength range and a blue wavelength range; and
the other one of the first and second wavelength ranges comprises a red wavelength range.

15. The method of claim 13, wherein:
one of the first and second wavelength ranges comprises one of a red wavelength range, a green wavelength range or a blue wavelength range; and
the other one of the first and second wavelength ranges comprises a different one of the red wavelength range, the green wavelength range or the blue wavelength range.

16. The method of claim 13, wherein the coating on the one of the major surfaces of the first optical waveguide comprises a first coating, the method further comprising:
using a second coating on one of the major surfaces of the second optical waveguide to reduce an amount of light that is refracted out of the one of the major surfaces of the second optical waveguide on which the second coating is located, compared to if the second coating was not used;
the second coating having a low reflectance of no more than 2 percent for light within the second wavelength range that is traveling within the bulk-substrate of the second optical waveguide and is incident on the one of the major surfaces of the second optical waveguide on which the second coating is located at each angle below the low threshold angle that is no more than 25 degrees relative to a normal; and the second coating having a high reflectance of at least 50 percent for light within the second wavelength range that is traveling within the bulk-substrate of the second optical waveguide and is incident on the one of the major surfaces of the second optical waveguide on which the second coating is located at each angle above a high threshold angle that is at least 30 degrees relative to the normal.

17. A method of claim 16, wherein the produced image also includes light within a third wavelength range that differs from the first and second wavelength ranges, wherein the near eye or heads up display system also includes a third optical waveguide arranged next to the second optical waveguide, the third optical waveguide including a bulk-substrate, an input-coupler and an output-coupler, the method further comprising:

using the input-coupler of the third optical waveguide to couple, into the bulk substrate of the third optical waveguide, light of the image that is within the input angular range and within the third wavelength range;

using the output-coupler of the third optical waveguide to couple out of the bulk-substrate of the third optical waveguide, light of the image within the output angular range and within the third wavelength range that traveled through the third optical waveguide from the input-coupler to the output-coupler at least in part by way of TIR;

using a third coating on one of the major surfaces of the third optical waveguide to reduce an amount of light that is refracted out of the one of the major surfaces of the third optical waveguide on which the third coating is located, compared to if the third coating was not used;

the third coating having a low reflectance of no more than 2 percent for light within the third wavelength range that is traveling within the bulk-substrate of the third optical waveguide and is incident on the one of the major surfaces of the third optical waveguide on which the third coating is located at each angle below the low threshold angle that is no more than 25 degrees relative to a normal; and the third coating configured to have a high reflectance of at least 50 percent for light within the third wavelength range that is traveling within the bulk-substrate of the third optical waveguide and is incident on the one of the major surfaces of the third optical waveguide on which the third coating is located at each angle above the high threshold angle that is at least 30 degrees relative to the normal.

18. The method of claim 13, wherein:

the high threshold angle is 30 degrees; and the coating is configured to have the high reflectance of at least 50 percent for light within the first wavelength range that is traveling within the bulk-substrate of the first optical waveguide that is incident on the one of the first and second major surfaces of the first optical waveguide on which the coating is located at each angle above 30 degrees relative relative to the normal of the one of the first and second major surfaces of the first optical waveguide on which the coating is located.

19. A near eye or heads up display system, comprising:

a display engine configured to produce an image including light within a red wavelength range, light within a green wavelength range and light within a blue wavelength range;

a waveguide assembly including a stack of first, second and third optical waveguides each of which includes a respective input-coupler, a respective output-coupler and a pair of major surfaces;

the first, second and third waveguides configured to transfer from its input-coupler to its output-coupler, light within the red wavelength range, light within the green wavelength range and light within the blue wavelength range, respectively;

a first coating on at least one of the major surfaces of the first optical waveguide;

a second coating on at least one of the major surfaces of the second optical waveguide;

a third coating on at least one of the major surfaces of the second optical waveguide;

the first coating having a low reflectance of no more than 2 percent for light within the red wavelength range that is traveling within the first optical waveguide and incident on a said major surface of the first optical waveguide having the first coating at each angle below a low threshold angle of no more than 25 degrees, and having a high reflectance of at least 50 percent for light within the red wavelength range that is traveling within the first optical waveguide and incident on a said major surface of the first optical waveguide having the first coating at each angle above a high threshold angle of at least 30 degrees;

the second coating having the low reflectance of no more than 2 percent for light within the green wavelength range that is traveling within the second optical waveguide and incident on a said major surface of the second optical waveguide having the second coating at each angle below the low threshold angle of no more than 25 degrees, and having the high reflectance of at least 50 percent for light within the green wavelength range that is traveling within the second optical waveguide and incident on a said major surface of the second optical waveguide having the second coating at each angle above the high threshold angle of at least 30 degrees; and the third coating having the low reflectance of no more than 2 percent for light within the blue wavelength range that is traveling within the third optical waveguide and incident on a said major surface of the third optical waveguide having the third coating at each angle below the low threshold angle of no more than 25 degrees, and having the high reflectance of at least 50 percent for light within the blue wavelength range that is traveling within the third optical waveguide and incident on a said major surface of the third optical waveguide having the third coating at each angle above the high threshold angle of at least 30 degrees.

20. The system of claim 19, wherein:

the high threshold angle is 30 degrees;

the first coating is configured to have the high reflectance of at least 50 percent for light within the red wavelength range that is traveling within the bulk-substrate of the first optical waveguide that is incident on the one of the first and second major surfaces of the first optical waveguide on which the first coating is located at each angle above 30 degrees relative relative to the normal of the one of the first and second major surfaces of the first optical waveguide on which the first coating is located;

the second coating is configured to have the high reflectance of at least 50 percent for light within the green wavelength range that is traveling within the bulk-substrate of the second optical waveguide that is incident on the one of the first and second major surfaces of the second optical waveguide on which the second coating is located at each angle above 30 degrees relative relative to the normal of the one of the first and second major surfaces of the second optical waveguide on which the second coating is located; and the third coating is configured to have the high reflectance of at least 50 percent for light within the blue wavelength range that is traveling within the bulk-substrate of the third optical waveguide that is incident on the one of the first and second major surfaces of the third optical waveguide on which the third coating is located at each angle above 30 degrees relative relative to the normal of the one of the first and second major surfaces of the third optical waveguide on which the third coating is located.

\* \* \* \* \*